United States Patent Office 3,154,519
Patented Oct. 27, 1964

3,154,519
VINYLIDENE FLUORIDE POLYMERS STABILIZED WITH BARIUM AND STRONTIUM COMPOUNDS
Hyman Iserson, Erdenheim, Pa., assignor to Pennsalt Chemicals Corporation, Philadelphia, Pa., a corporation of Pennsylvania
No Drawing. Filed July 11, 1960, Ser. No. 41,747
14 Claims. (Cl. 260—45.75)

This invention is directed to the stabilization of vinylidene fluoride polymers against high temperature degradation.

High molecular weight vinylidene fluoride polymer derived from free radical polymerization averages more than 2000 monomer units per chain. The polymer molecule is closely packed with considerable cross bonding of hydrogen and fluorine atoms. This polymer is highly crystalline and can be extruded only at very high temperatures in the neighborhood of 200–250° C.

Vinylidene fluoride polymer may be used to form coatings or coverings in the nature of protective films for adherence to mechanical equipment such as fans, blowers, agitators, etc. where a high degree of resistance to chemical attack or to solvents is desired. The polymer is also used for making pipe, tubing, plastic pumps for chemical service and many other items.

Without the use of a stabilizer additive the temperatures at which this highly crystalline material must be fabricated can result in a degradation of the polymer. In addition to requiring that the vinylidene fluorine polymer be stable at extrusion or injection molding temperatures particular industrial applications of vinylidene fluoride polymer require that it be stable at temperatures in the range of 250 to 275° C.

When vinylidene fluoride polymer is maintained for 1 hour at a temperature of 270° C., the polymer may decompose to some extent and lose its natural white color. It acquires an objectionable tan to dark brown appearance. This degradation is accompanied with loss of hydrogen fluoride, a type of degradation common to all partially fluorinated organic plastics at high temperatures.

Vinylidene fluoride polymer is conveniently prepared in an aqueous polymerization system employing a catalyst to initiate polymerization. An example of such a polymerization reaction utilizing a persulfate catalyst or an organic peroxide catalyst is described in United States Patent 2,435,537. In these polymerizations the polymer is obtained as a precipitated solid at the conclusion of the polymerization reaction.

In many instances it is desirable to have the product in the form of a latex instead of as a precipitated polymer. The principal advantage of having a latex is that it can easily be removed from the reactor. In the organic peroxide catalyzed polymerization the product may be obtained in latex form if a suitable surfactant is employed. Satisfactory surfactants for vinylidene fluoride polymer latex formation include the perfluoroaliphatic and perfluorocycloaliphatic sulfonic acids and water soluble salts thereof. The surfactants may be incorporated in the polymer with the acid groups exposed to external chemical reaction, and thus become a point of weakness in the polymer itself. It is believed that these acid groups contribute to the degradation of the polymer at high temperatures.

I have now discovered that vinylidene fluoride polymer containing a minor amount of a perfluoroaliphatic or perfluorocycloaliphatic sulfonic acid salt can be stabilized for use at high temperatures by the inclusion of small amounts of water soluble salts of barium and strontium. These strontium and barium salts are effective heat stabilizers for vinylidene fluoride polymer containing a residual amount of a perfluoroaliphatic or perfluorocycloaliphatic sulfonic acid salt and which have a plasticity of 3000 or lower. Plasticity is an indication of the molecular weight of the polymer.

I have been unable to determine the molecular weight of vinylidene fluoride polymer because the polymer's chemical inertness prevents the formation of true solutions from which molecular weight determinations can be made. Accordingly, the plasticity number of the polymer has been devised as a substitute for molecular weight. The plasticity number is the area in square millimeters of a compression molded plaque obtained when 0.5 gram of the polymer is heated between two aluminum plates in a press at atmospheric pressure at 225° C. for 0.5 minutes followed by heating at 225° C. for 1 minute at a pressure of 2500 pounds per square inch. Thus, the plasticity number varies inversely with the molecular weight of the polymer.

The conventional heat stabilizers for halogen-containing plastics such as polyvinyl chloride proved to be of little or no value when incorporated in vinylidene fluoride polymers and tested at temperatures as high as 270° C. Inorganic acid derivatives, metal oxides, long-chain organic acid metal salts, amine-type and phenol-type antioxidants and dialkyldithiocarbamic metal salts proved ineffective as stabilizers for vinylidene fluoride polymer at high temperatures. Incorporation of as much as 3 parts of these additives per 100 of polymer failed to maintain the polymer clear and free of color even at temperatures as low as 200° C. for periods of 2 to 8 hours.

In contrast to the shortcomings of the prior art stabilizers the stabilizers which I have discovered prevent discoloration and/or degradation of the vinylidene fluoride polymer at temperatures as high as 270° C. for periods as long as 8 hours. This temperature and time are more than adequate for the normal extruding or molding operation.

The surfactants that I use in my polymerization reaction to product a latex of vinylidene fluoride polymer instead of the coagulated solid which is obtained without the aid of a surfactant are the perfluoroaliphatic and perfluorocycloaliphatic sulfonic acid salts. It is necessary that a highly halogenated surfactant be used to prepare the polymer latex since any other type of surfactant will inhibit and prevent polymerization. While the perfluoroaliphatic and perfluorocycloaliphatic portions of the surfactant molecules used are heat stable in and of themselves at temperatures at which the vinylidene fluoride polymer is molded or extruded, the sulfonic acid portion of the surfactant is not heat stable, and it was necessary to find some means of stabilizing it if heat stability was to be obtained at temperatures within the range of 250 to 270° C.

The surfactants I have found useful in my invention may be represented by the formula $R_fSO_3M$ where $R_f$ reprents a saturated fluorocarbon of the aliphatic or cycloaliphatic type containing from 4 to 12 carbon atoms and M is a cation. Particular perfluorosulfonic acids which I have found useful in the form of salts are:

Perfluoro butyl sulfonic acid;
Perfluoro isoamyl sulfonic acid;
Perfluoro n-hexyl sulfonic acid;
Perfluoro n-heptyl sulfonic acid;
Perfluoro n-octyl sulfonic acid;
Perfluoro n-decyl sulfonic acid;
Perfluoro n-lauryl sulfonic acid;
Perfluoro cyclohexane sulfonic acid;
Perfluoro (4-methyl cyclohexane) sulfonic acid;
Perfluoro (2-methyl cyclohexane) sulfonic acid;
Perfluoro cyclohexane methyl alphasulfonic acid;
Perfluoro dimethyl cyclohexane sulfonic acids;
Perfluoro ethyl cyclohexane sulfonic acid;
Perfluoro isopropyl cyclohexane sulfonic acid;

Perfluoro diethyl cyclohexane sulfonic acids;
Perfluoro di-(cyclohexane) sulfonic acids;
Perfluoro di-(cyclohexane) di-sulfonic acids.

Sodium, potassium, lithium, ammonium and quaternary ammonium are useful as cations.

The amount of perfluoroalkyl or perfluorocycloalkyl sulfonate required to produce a satisfactory latex will vary from as little as 0.01% by weight of the total polymerization mixture to as much as 5% by weight. Amounts greater than 5% by weight would not impart additional dispersing ability. Generally, I prefer about 0.05% to about 2.0% by weight of the surfactant incorporated into the final polymer.

The perfluoro sulfonic acids may be made by methods which are well known in the art such as are set forth in U.S. 519,983.

Heretofore it was not believed possible for those skilled in the art to employ a perfluoroalkyl sulfonic acid salt as a surfactant for ethylenic unsaturated fluorocarbon polymers because of the known instability of the sulfonic acid group when subjected to temperatures in excess of 200° for any considerable time. Thus, it was an important aspect of my invention to discover materials which enable one to use these perfluoroalkyl sulfonates as surfactants for vinylidene fluoride polymers without rendering them unstable at high temperatures.

The materials which I have found suitable to stabilize vinylidene fluoride polymer containing small amounts of the perfluoroaliphatic and perfluorocycloaliphatic sulfonic acid surfactants are the water soluble salts of barium and strontium. Examples of water soluble barium salts which provide suitable stabilization are barium acetate, barium bromide, barium chloride, barium formate, barium hydroxide, barium nitrate and barium pyrophosphate. Examples of water soluble strontium salts which are useful in the high temperature stabilization of this particular combination of polymer and surfactant are strontium nitrate, strontium acetate, strontium hydroxide and strontium chloride. My preferred barium salts for stabilizing vinylidene fluoride polymer containing small amounts of perfluoroalkyl and perfluorocycloalkyl sulfonate surfactant are barium hydroxide and barium perchlorate. These salts are preferred because of their ready commercial availability at low cost and because of the fact that they give stabilization to the vinylidene fluoride polymers considerably greater than that afforded by the other barium salts. For the same reasons strontium nitrate is my preferred strontium salt. I do not know the reason for the superiority of the barium hydroxide, barium perchlorate and strontium nitrate as heat stabilizers.

Calcium salts have not shown important properties in stabilizing vinylidene fluoride polymers containing perfluoroalkyl sulfonic acid surfactants at high temperatures although some slight improvement was noticed in the appearance of the heat treated resin when using small amounts of calcium acetate. However, with calcium chloride extremely poor results were obtained. Similarly, with cadmium salts some slight improvement was noticed in the use of cadmium acetate and cadmium chloride in heat stabilizing properties. However, neither of these salts was suitable for stabilizing the vinylidene fluoride polymer surfactant combination for 1 hour at 270° C.

The fact that these water soluble barium and strontium salts are heat stabilizers for combinations of vinylidene fluoride polymer containing a minor amount of perfluoroalkyl sulfonic acid surfactant is proven by the fact that when vinylidene fluoride polymer not containing any perfluoroalkyl sulfonic acid surfactant is compounded or is treated with the same amounts of barium or strontium salts and especially with the preferred heat stabilizing salt barium hydroxide, the polymer after heat treating at 270° C. is dark black, carbonaceous and of no value.

The amount of water soluble barium or strontium salt added to stabilize vinylidene fluoride polymer varies from as little as 0.006% to as high as 3% by weight of the polymer reaction mixture. Amounts less than this will not produce the desired stabilization of the polymer when subjected to high temperatures. Greater amounts, while they still provide heat stabilization, result in increased opacity.

For example vinylidene fluoride polymer latex prepared with potassium perfluorooctyl sulfonate, $C_8F_{17}SO_2OK$, was satisfactorily stabilized for film forming purposes by the addition of 2.9 pounds of barium hydroxide per 100 pounds of a vinylidene fluoride latex. The latex contained from 12 to 14% solids. A preferred range of additive for stabilization purposes is about 0.03% to about 1% by weight of the polymerization reaction mixture.

The concentration of the soluble barium salt or strontium salt in water which is added to the polymerization reactor or to the solid polymer itself as hereinafter more fully described is not important. A suitable concentration of the stabilizer salts in aqueous solution varies from 1 to 10% although other concentrations may be used if desired. While concentration is not important, the amount of the stabilizer added to the polymer is important as discussed above.

In one aspect of my invention the stabilizer salt is added as a finely-divided solid or as an aqueous solution directly to the latex after completion of the polymerization after which the polymer is washed thoroughly with water and then dried. In another aspect of my invention the latex resulting from the polymerization reaction may be coagulated, the precipitated polymer washed with aqueous barium hydroxide, for example, and then with water. More conveniently, the barium hydroxide is added to the latex solution in the polymerization reactor under conditions of agitation, and, if desired, the barium hydroxide solution will assist in the coagulation of the latex together with continued agitation.

In another aspect of my invention the vinylidene fluoride polymer resulting from the polymerization may be processed entirely to a dry state without contact with the stabilizer salt and thereafter the finely-divided polymer may be washed with an aqueous solution of stabilizer salt to effect the desired addition of the stabilizer. In this practice of my invention slightly higher amounts of stabilizer per pound of dry polymer will be required since there is less opportunity for contact of the stabilizer with the surfactant acid group in the washing operation.

The barium or strontium salt which reacts with the perfluoroalkyl sulfonic acid surfactant incorporated in the vinylidene fluoride polymer is retained in the polymer and becomes a part thereof. This has been determined by chemical analysis of the polymer which shows as much as from 0.01 to about 2.0% barium or strontium in the final polymer. Generally, the amount of incorporated barium or strontium will be in the range of 0.05 to 1.0% by weight.

It is known to those familiar with the production of fluorocarbon polymers that the higher the molecular weight in the polymer, the more stability it has against degradation by the application of high temperatures. This is true with the vinylidene fluoride polymer with which I have been working and I have discovered that my heat stabilizers for vinylidene fluoride polymer are effective with polymer having a plasticity of about 1600 to 3000. At plasticities in excess of 3000, that is with a decreasing molecular weight, the polymer is less stable against high temperatures and with material of this type the stabilizers of my invention are not sufficiently effective. Vinylidene fluoride polymer with a plasticity number lower than 1600 has considerable inherent stability and accordingly, much less amount of the stabilizer is required.

The best mode of practicing my invention will be apparent from a consideration of the following examples.

EXAMPLE 1

Polyvinylidene fluoride was prepared in latex form by means of a polymerization recipe which included potassium perfluorooctylsulfonate as a surfactant. The potassium perfluorooctylsulfonate analyzed as follows on an anhydrous basis: carbon, 17.38; sulfur, 6.07; potassium, 7.03. The polymer latex was coagulated with sodium chloride solution, filtered by centrifugation, washed thoroughly on a centrifuge with distilled water and dried at 120–125° C. The polymer had a plasticity number of about 2000. The polymer was rewetted with methanol and water, and sucked dry on a Buchner funnel. A 50 gram sample of the wet cake was stirred 3 minutes in a Waring blender with 150 ml. of each of the solutions shown in Table 1. The stirred mixture was poured on a Buchner funnel, and the residual polymer in the blender was washed onto the funnel with 100 ml. wash solution. The polymer was filtered under vacuum, dried at 120° C. overnight in an oven and tested for heat stability first at 250° C., then at 270° C. A light color after the heat treatment indicates satisfactory stabilization while a tan, dark brown or black color indicates excessive polymer degradation.

*Table 1*

| Wash Solution | Polymer Appearance after Heat Stability Test at— | |
|---|---|---|
| | 250° for 2 hours | 270° for 1 hour |
| Cold water | Black | |
| Methanol | Dark-brown to black | |
| 5% aq. NH₄OH | do | |
| 1% aq. Ba(OH)₂·8H₂O | No discoloration | Light colored. |
| Sat. MgCO₃ | Black | |
| 1% Thermolite in methanol | do | |
| 1% aq. tetraethylurea | do | |
| Hot water | Dark-brown to black | |
| 1% aq. BaCl₂ | | Do. |
| 1% aq. urea | | Black. | cm. The polymer was then dried at 120–125° and heat tested at 270° for one hour in an oven.

*Table 2*

| Additive in Aqueous Solution | Polymer Appearance after 270° C. at 1 Hour |
|---|---|
| None | Black. |
| 10% NaCl | Do. |
| 10% Na₂SO₄ | Do. |
| 10% NaNO₃ | Do. |
| 10% ZnSO₄ | Do. |
| 10% CaCl₂ | Do. |
| 10% KF | Dark-brown to black. |
| 10% lead acetate | Black. |
| 10% sodium acetate | Dark-brown to black. |
| 10% zinc acetate | Black. |
| 10% sodium citrate | Dark-brown to black. |
| 10% (NH₄)₂CO₃ | Black. |
| 5% Ba(OH)₂·8H₂O | Light, not discolored. |
| 10% NaOH | Black. |

EXAMPLE 3

One hundred ml. samples of polyvinylidene fluoride latex prepared as described in Example 1 were treated by adding to them the additive shown in the first column of Table 3. Afterwards the latex with additive was coagulated by stirring and then filtered on a suction filter, washed with materials indicated in the second column of Table 3 and then dried. Half-gram samples were compression molded at 225° for one minute and 10 g. samples were heated at 270° for one hour.

*Table 3*

| Added to 100 ml. Latex (Aqueous Solution) | Solutions Used for Washing Polymer | Appearance of Polymer after Heat Treatment of 270° C., one hour | Appearance of Molded Plaque, 225° C., one minute |
|---|---|---|---|
| No additive | Washed with H₂O | Black | Clear, colorless. |
| 2 ml. 5% Ba(OH)₂·8H₂O | do | Light | Few small cloudy areas, colorless. |
| 1 ml. 5% Ba(OH)₂·8H₂O | do | do.¹ | Clear, colorless. |
| 28 ml. satd. Ca(OH)₂ | do | Black | |
| 0.75 ml. 10% NaCl | Washed with H₂O, washed with slurry of 1 g. MgO in 200 ml. H₂O. | Dark-brown | |
| 0.75 ml. 10% NaCl | Washed with H₂O, washed with slurry of 1 g. ZnO in 200 ml. H₂O. | Black and opaque white | |
| 0.75 ml. 10% NaCl | Washed with H₂O, washed with slurry of 1 g. CaO in 200 ml. H₂O. | Dark-brown, black | |
| 0.75 ml. 10% NaCl | Washed with H₂O, washed with 100 ml. 1% Ba(OH)₂·8H₂O. | Light | Cloudy areas, colorless. |
| 0.75 ml. 10% NaCl | Washed with H₂O, washed with 200 ml. 1% Ba(OH)₂·8H₂O. | do | Do. |
| 0.75 ml. 10% NaCl | Washed with H₂O, washed with 100 ml. 5% Ba(OH)₂·8H₂O. | do | Do. |
| 1 ml. 5% Ba(OH)₂·8H₂O | Washed with H₂O, washed with 200 ml. 1% Ba(OH)₂·8H₂O. | do.² | Do. |
| 1 ml. 5% Ba(OH)₂·8H₂O | Washed with 200 ml. 1% Ba(OH)₂·8H₂O. | do.³ | Do. |

Analyses of treated polymer for barium: ¹ <0.1%. ² 0.35%. ³ 0.2%.

EXAMPLE 2

0.75 ml. portions of the solutions shown in Table 2 were added to 100 ml. samples of latex of which the polymer had a plasticity number of 2050 and prepared as described in Example 1. The latex was stirred until complete coagulation occurred, then the polymer was filtered by suction and repeatedly washed with distilled water until the resistivity of the filtrate was 50,000 ohm-

EXAMPLE 4

Vinylidene fluoride polymer prepared with a perfluoroalkyl sulfonic acid surfactant as described in Example 1 had a plasticity within the range of 2000 to 2300. One hundred ml. portions of latex were treated with 4 mls. of the aqueous solutions appearing in Table 4. The treated polymer was subjected to a temperature of 270° C. for 1 hour in all cases and at 200° C. for 4 hours in a few instances.

Table 4

| Polymer Plasticity number | Additive | Polymer Appearance after Heat Stability Test at— | |
|---|---|---|---|
| | | 270° C. for 1 hour | 200° C. for 4 hours |
| 2300 | 5% calcium acetate | Pinkish-brown | Very good. |
| 2300 | 5% barium chloride | Light pink with dark areas | do |
| 2300 | do | do | do |
| 2300 | 5% barium nitrate | Light amber, dark areas | do |
| 2300 | do | do | do |
| 2300 | 5% barium perchlorate | Light, very good | Excellent. |
| 2050 | 5% barium acetate | Light with dark spots, fair | do |
| 2050 | do | do | do |
| 2050 | 5% strontium nitrate | Light, very good | do |
| 2050 | do | do | Do. |
| 2050 | do | do | Do. |
| 2050 | 5% cadmium acetate | Pinkish-brown | Very good. |
| 2050 | 5% cadmium chloride | do | Do. |

EXAMPLE 5

A polyvinylidene fluoride latex formed without a perfluorosulfonic acid surfactant was treated with $$Ba(OH)_2 \cdot 8H_2O$$

as above and the polymer obtained from this latex was heat tested at 270° for one hour. The polymer turned a greyish-black color and was unsatisfactory in appearance. The same polymer which had not been treated with barium hydroxide solution had a light tan color when heated at 270° C. for one hour.

EXAMPLE 6

A vinylidene fluoride latex was prepared as described in Example 1 using the monohydrate of the potassium salt of perfluoro(di-perfluoromethyl) cyclohexane sulfonic acid—formula $C_8F_{15}SO_3K \cdot H_2O$ which analyzed—18.32% carbon, 57.27% fluorine; 6.32% sulfur; 7.88% potassium on an anhydrous basis. One hundred mls. samples of the latex were treated with 0.75 ml. of 10% barium hydroxide in aqueous solution after which the polymer was filtered, washed with distilled water and dried. After subjecting the polymer to a temperature of 270° C. for 1 hour, the polymer was light colored.

EXAMPLE 7

Twenty milliliters fo $Ba(OH)_2 \cdot 8H_2O$ containing 2.0% barium was added to 800 milliliters of vinylidene fluoride polymer latex. The mixture was filtered and the polymer was washed with water. A total of 1160 milliliters of filtrate was obtained and analysis of the filtrate for barium indicated 0.03%. The original latex contained about 14% by weight of polymer solids. The percent barium in the dry polymer was 0.045% by weight.

EXAMPLE 8

Vinylidene fluoride polymer of varying plasticity number was prepared without the use of any surfactant, washed with water, dried and tested for heat stability at 270° C. When barium hydroxide was added to this polymer and subjected to high temperature, the polymer turned dark amber in color. The data appear in Table 5.

Table 5

| Polymer Plasticity Number | Additive | Polymer Appearance after Heat Stability Test at 270° C. for 1 hr. |
|---|---|---|
| 3020 | None | Light color. |
| 3020 | do | Do. |
| 2200 | do | Do. |
| 3000 | do | Do. |
| 3000 | 4 ml. of 5% $Ba(OH)_2$ in 100 ml. $H_2O$ | Dark amber. |

I claim:

1. The process for the high temperature stabilization of vinylidene fluoride polymer containing a minor amount of a surfactant represented by the formula $R_fSO_3M$ where $R_f$ is selected from the group consisting of perfluoroaliphatic and perfluorocycloaliphatic radicals containing from 4 to 12 carbon atoms and where M is a cation comprising contacting the said polymer with at least one heat stabilizing additive selected from the group consisting of water soluble compounds of barium and strontium and thereafter separating the polymer.

2. The process of claim 1 in which the heat stabilizing additive is added in aqueous solution.

3. The process for the high temperature stabilization of vinylidene fluoride polymer which has been prepared in latex form by the inclusion of a minor amount of surfactant represented by the formula $R_fSO_3M$ where $R_f$ is selected from the group consisting of perfluoroaliphatic and perfluorocycloaliphatic radicals containing from 4 to 12 carbon atoms and where M is a cation comprising contacting the said latex with at least one heat stabilizing additive selected from the group consisting of water soluble compounds of barium and strontium and thereafter separating the polymer.

4. The process of claim 3 in which the heat stabilizer additive is added in aqueous solution.

5. The process of claim 4 in which the heat stabilizer additive is barium hydroxide.

6. The process of claim 4 in which the heat stabilizer additive is barium perchlorate.

7. The process of claim 4 in which the heat stabilizer additive is strontium nitrate.

8. The process of claim 3 in which the heat stabilizing additive comprises from 0.006% to about 3.0% by weight of the polymer in latex form.

9. The process of claim 3 in which the polymer is washed with water immediately prior to drying.

10. The process of claim 4 in which the aqueous solution of the heat stabilizing additive has a concentration within the range of 1 to 10% by weight.

11. Vinylidene fluoride polymer containing a minor amount of a compound represented by the formula $R_fSO_3M$ where $R_f$ is selected from the group consisting of perfluoroaliphatic and perfluorocycloaliphatic radicals containing from 4 to 12 carbon atoms and M is a cation reacted wtih at least one member of the class consisting of water soluble barium and strontium compounds.

12. The composition of claim 11 in which the water soluble salt is barium hydroxide.

13. The composition of claim 11 in which the water soluble compound is barium perchlorate.

14. The composition of claim 11 in which the water soluble compound is strontium nitrate.

References Cited in the file of this patent

UNITED STATES PATENTS

| 2,559,752 | Berry | July 10, 1951 |
| 2,732,398 | Brice et al. | Jan. 24, 1956 |
| 2,784,170 | Walter et al. | Mar. 5, 1957 |
| 2,874,198 | Barnhart et al. | Feb. 17, 1959 |
| 2,879,257 | Walter et al. | Mar. 24, 1959 |
| 2,922,824 | Honn et al. | Jan. 26, 1960 |

UNITED STATES PATENT OFFICE
CERTIFICATE OF CORRECTION

Patent No. 3,154,519                        October 27, 1964

Hyman Iserson

It is hereby certified that error appears in the above numbered patent requiring correction and that the said Letters Patent should read as corrected below.

Column 2, line 38, for "product" read -- produce --; column 3, line 16, for "U.S. 519,983" read -- U.S. 2,519,983 --; column 7, line 43, for "fo" read -- of --.

Signed and sealed this 6th day of April 1965.

(SEAL)
Attest:

ERNEST W. SWIDER                        EDWARD J. BRENNER
Attesting Officer                        Commissioner of Patents